2,985,488
Patented May 23, 1961

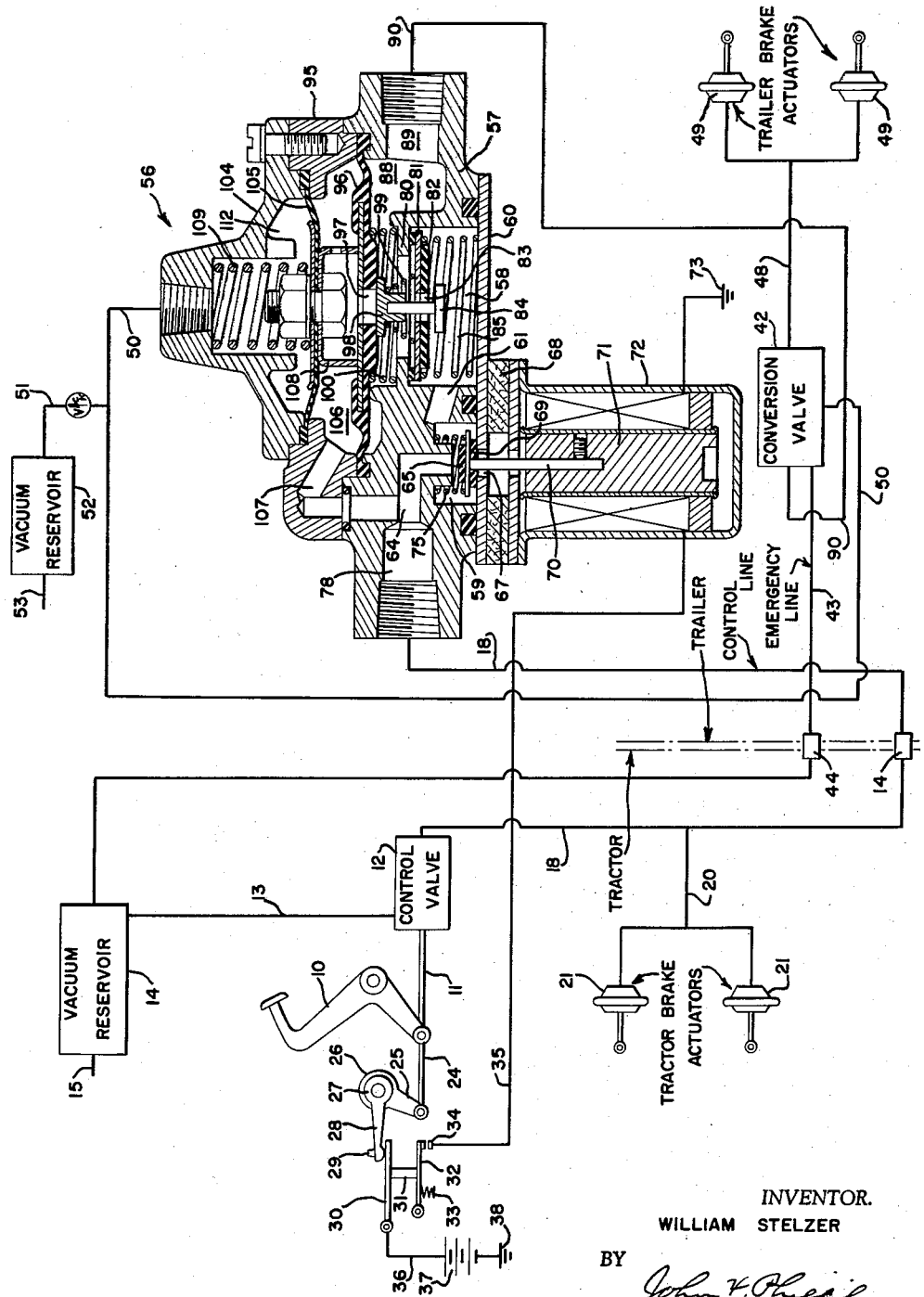

2,985,488

TRACTOR-TRAILER BRAKE SYSTEM

William Stelzer, Bloomfield Hills, Mich., assignor to Kelsey-Hayes Company, Detroit, Mich., a corporation of Delaware Filed May 12, 1958, Ser. No. 734,642

16 Claims. (Cl. 303—15)

This invention relates to a tractor-trailer brake system and is an improvement over the structure shown in the prior patent to Jeannot G. Ingres, No. 2,571,885, granted October 16, 1951.

An important object of the invention is to provide a novel simplified type of auxiliary control valve mechanism, particularly adapted for use with tractor-trailer brake systems using vacuum as a source of power, and wherein initial operation of the brake pedal controls an auxiliary valve mechanism to provide for substantially instant initial application of the trailer brake actuators, and wherein there is a gradual transition from the initial trailer brake application to the normal trailer brake application occurring after the controlling of the trailer brake system is taken over by pressures in the control line, induced by operation of the tractor brake actuators.

A further object is to provide such a system wherein pressure supplied to the usual conversion valve through operation of the auxiliary valve upon initial movement of the brake pedal from normal off position, is allowed to reach only a predetermined maximum prior to the taking over of the controlling of the trailer brake actuators in accordance with the degree of actuation of the tractor brakes.

A further object is to provide a system of the character referred to, wherein an electrically controlled auxiliary valve mechanism is interposed in the service line leading to the conversion valve on the trailer for providing rapid initial snubbing of the trailer brakes, and wherein, upon the building-up of pressure in the control line, the auxiliary valve is rendered inoperative for controlling the degree of application of the trailer brakes, and wherein the pressure supplied through the control line to the conversion valve will be the same pressure supplied to the tractor brake actuators.

Other objects and advantages of the invention will become apparent during the course of the following description.

In the drawing I have shown one embodiment of the invention. In this showing:

The figure is a diagrammatic showing of a tractor-trailer brake system embodying the present invention, the auxiliary valve mechanism forming the principal subject matter of the invention being shown in section.

Referring to the drawing, the numeral 10 designates a conventional brake pedal connected as at 11 to a control valve mechanism 12 having a line 13 leading to a vacuum reservoir 14. This reservoir is connected by a line 15 to any suitable source of vacuum (not shown) to maintain the desired degree of vacuum in the reservoir. The control valve 12 is connected to a control line 18 extending rearwardly to the tractor through the usual detachable connector 19. Lines 20 are tapped into the control line 18 and lead to tractor brake actuators 21 of the vacuum suspended type. It will be obvious that in accordance with conventional practice, operation of the brake pedal 10 operates the control valve 12 to cut off vacuum supplied to the tractor brake actuators and admit air thereto, thus effecting the application of the tractor brakes.

The brake pedal 10 is connected as at 24 to an arm 25 carried by a disk 26 frictionally engaged by a second disk 27. The latter disk is provided with an arm 28 normally occupying the position shown in the drawing in engagement with a stop member 29 limiting its movement to off position. The arm 28 engages a switch-operating arm 30 connected as at 31 to a switch arm 32 biased to open position by a spring 33. The switch arm 32 is movable into engagement with a contact 34 connected to one end of a wire 35, further referred to below. The arm 30 is connected as at 36 to one terminal of a source 37, having its other terminal grounded as at 38. The switch mechanism shown forms per se no part of the present invention, and is disclosed in the prior patent to Jeannot G. Ingres, identified above.

The trailer is provided with the usual relay or conversion valve 42. An emergency vacuum line 43 is connected at one end to the conversion valve and at its other end to the vacuum reservoir 14, the usual detachable connector 44 being arranged in such line. The emergency line is conventional and is under vacuum pressure at all times to render the conversion valve 42 subject to normal operation. In the event of the rupturing of the line 43, for example, if the trailer becomes disconnected from the tractor, atmospheric pressure admitted to the line 43 will operate the conversion valve in the well-known manner to effect application of the trailer brakes.

The conversion valve is connected through line 48 to trailer brake actuators 49, usually of the air-suspended type. The line 48 therefore is normally connected to the atmosphere through the conversion valve 42, and operation of the latter as described below connects the line 48 to one end of a vacuum line 50, communicating through a line 51 with a vacuum reservoir 52 having an air exhaust line 53 connected to any suitable vacuum-creating mechanism.

The auxiliary valve mechanism of the present invention is indicated as a whole by the numeral 56. Such valve mechanism comprises a body 57 having in the bottom thereof chambers 58 and 59 closed by a bottom plate 60 secured in sealed relation against the bottom of the body 57. The chambers 58 and 59 are in constant communication through a passage 61. Therefore the chambers 58 and 59 constitute in effect a single chamber and are referred to as such in certain of the claims and defined as a "first chamber."

A passage 64 in the body 57 has its inner lower end forming a valve seat normally open for communication of the chamber 59 with the passage 64 and adapted to be closed by a valve 65. The bottom plate 60 is provided with a port 67 opening into the interior of an annular air cleaner 68 and normally closed by a valve 69 carried by a stem 70. Such stem is secured to the armature 71 of a solenoid 72, one terminal of which is connected to the other end of the wire 35. The second terminal of the solenoid is grounded as at 73. It will be apparent that energization of the solenoid 72 closes the valve 65 and opens the valve 69, and these valves are biased to the normal position shown by a spring 75.

The passage 64 opens into a port 78 communicating with the other end of the control line 18. Vacuum normally exists in the line 18 as stated above, and accordingly vacuum is normally present in the chambers 58 and 59.

The body 57 at the top of the chamber 58 is provided with an in-turned flange 80 forming a seat engageable by a check valve 81 having a resilient valve seat 82 therebeneath. The elements 81 and 82 are provided with a port 83 therethrough adapted to be closed by a normally open valve 84. The elements 81 and 82 are biased upwardly by a spring 85 and accordingly the check valve 81 is normally closed.

The opening through the flange 80 communicates with a second chamber 88 having a port 89 connected to one end of a line 90 leading to the conversion valve. This line forms in effect a part of the control line, and when the trailer brakes are substantially applied, as described below, the control line 18 and line 90 are in full communication with each other. Therefore the auxiliary valve mechanism 58 may be considered to be interposed in the control line.

Secured to the top of the body 57 is an annular member 95, and between such member and the body 57 is clamped the peripheral portion of a diaphragm 96. The bottom of this diaphragm is open to the chamber 88. The diaphragm 96 is provided with an axial port 97 normally closed by a valve 98 connected to the valve 84 and biased to closed position by a spring 99. The diaphragm 96 is biased upwardly by a spring 100. A cap member 104 is fixed against the top of member 95 and secures in position with respect thereto the periphery of a diaphragm 105. The diaphragms 96 and 105 form therebetween a third chamber 106 communicating through a passage 107 with the passage 64. Pressure present in the rear end of the control line 18, therefore, is always duplicated in the chamber 106.

The diaphragm 105 carries an inverted apertured cup member 108 normally engaging the diaphragm 96, and the member 108 and diaphragm 105 are biased downwardly by a spring 109 in the cap member 104. Within the cap member 104 and above the diaphragm 105 is formed a fourth chamber 112 connected to the vacuum line 50.

Operation

The solenoid 72 is shown as being operable by the switch device controlled by the brake pedal, but it will be apparent that it may be operated by a manually operable switch which would take the place of a conventional hand control valve.

The parts of the apparatus normally occupy the positions shown. Upon initial operation of the brake pedal, the switch 32 will be closed to energize the solenoid 72, whereupon the armature 71 will move upwardly to open the valve 69 and close the valve 65. Accordingly, the chamber 59 will be closed to the forward end of the control line 18 and will be opened to the atmosphere through the port 67 and air cleaner 68. Accordingly, whereas vacuum will have previously existed in the chamber 58, this chamber now will be opened to the atmosphere. Air accordingly will flow through the normally open port 83 into the chamber 88 and thus through the line 90 to the conversion valve to operate the latter and connect the line 48 to the vacuum line 50 to operate the trailer brake actuators. This operation takes place prior to the building-up of pressure in the control line and in the chamber 106 upon further movement of the brake pedal to operate the tractor brake actuators 21. Substantial time lag occurs before substantial pressure is built up in the chamber 106, and the present mechanism provides for immediate operation of the conversion valve 42 to apply the tractor brakes upon initial movement of the brake pedal 10 from its off position.

At the time the chamber 58 is connected to the atmosphere, there still will be vacuum existing in the chamber 106, while the chamber 112 above the diaphragm 104 is constantly connected to the vacuum reservoir 52. When pressure in the chamber 88 has increased to a predetermined point, such pressure will act upwardly through the diaphragm 96, member 108 and diaphragm 105 to compress the spring 109. Upward movement of the diaphragm 96 will take place with the valve 98 remaining closed, being biased upwardly by the spring 99. When the desired predetermined rise in pressure has been reached in the chamber 88, upward movement of the diaphragm 96 and valve 98 will result in movement of the valve 84 to the closed position, which will be the lap position of the valves 84 and 98. The pressure now existing in the chamber 88 and accordingly in the line 90 is sufficient to cause the conversion valve 42 to operate and effect a light snubbing action of the trailer brakes. If pressure in the chamber 88 increases above the desired predetermined point, the diaphragm 96 will be slightly elevated. With the valve 84 closed, the valve 98 will remain stationary, and upward movement of the diaphragm 96 will crack the valve 98 to relieve pressure from the chamber 88 into the chamber 106, which still is under some partial vacuum.

The pressure in the control line 18 gradually increases as tractor brake operation progresses, and accordingly pressure in the chamber 106 will increase. This gradually increasing pressure acts on the top of the diaphragm 96 on an area which is equal to the effective area of the diaphragm 96 less the effective area of the smaller diaphragm 105. Whereas the controlled pressure in the line corresponding to the line 90 leading to the conversion valve remains static in the prior patent referred to until it is surpassed by pressure through the control line, the present device so functions that pressure in the chamber 88 and the line to the conversion valve continues to gradually increase after pressure in the control line 18 increases. Therefore, the two pressures blend together in an intermediate stage of brake application. This stage is reached when the control pressure in the chamber 106 is sufficient to collapse the spring 109 whereby the port 97 is opened and the valve 84 closed. Thus, from this point on, the pressure in the line 90 is the same as in the rear end of the control line 18. Obviously, the operation referred to opens the chamber 88 to the chamber 106, in which case the lines 18 and 90 and the communicating ports, chambers, etc. of the valve mechanism 56 constitute an open control line.

When the brakes are released, while there is a gradual downward modulation of brake application, the pressure in the chamber 88 drops, together with pressure in the control line 18, due to the open port 97. The lowering of the pressure in the chamber 106 gradually releases the spring 109 to effect a downward pressure through member 108 against the diaphragm 96 to seat the diaphragm 96 on the valve 98 and thus close the port 97.

It will be apparent that the first increment of movement of the brake pedal 10 from off position will have closed the switch 32, whereupon the arm 28 remains stationary during the remainder of the brake applying movement of the pedal 10. Upon initial return movement of the pedal 10, the frictional engagement between the disks 26 and 27 will result in the opening of the switch 32, thus de-energizing the solenoid 72 to close the valve 69 and open the valve 65. When the brake pedal is released, therefore, a further reduction in pressure in the control line 18 beyond the point at which the valve 98 closes results in a reduction in pressure in the chamber 58. Under such conditions, the check valve 81 will be opened by the higher pressure in the chamber 88 to relieve such pressure into the chamber 58 and thus into the control line 18. Still further reduction in pressure in the control line 18 causes the diaphragm 96 to assume its lowermost position shown in the drawing, and all of the parts will now be in their normal inoperative positions.

From the foregoing, it will be apparent that the present mechanism provides a smooth evenly modulated action in which immediate limited trailer brake operation will take place upon initial movement of the brake pedal from its normal off position. Moreover, there will be a gradual transition from the moderate initial pressure in the chamber 88, when the brake pedal is initially moved, to the higher pressure occurring when the port 97 is opened. In later stages of brake operation wherein the control line 18 is fully opened to the line 90, the control pressure supplied through the line 90 to the conversion valve 42 will be the pressure affecting the tractor brake actuators 21, and accordingly the conversion valve 42 will function normally to provide trailer brake actuation proportionate to tractor brake actuation.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. In a tractor-trailer brake system, a control line having a forward end subject to the creation of pressure impulses by means on the tractor for normally connecting it to a source of vacuum, a conversion valve on the trailer to which the rear end of said control line is connected, trailer brake actuators connected to said conversion valve, said conversion valve being operable by pressure impulses in said control line to connect said trailer brake actuators to a source of vacuum, and a valve mechanism connected in said control line, said valve mechanism comprising valve elements controlling communication through said valve mechanism and normally closing communication between said control line and normally closing communication between said control line and the atmospheres, means comprising an electrically operable device subject to control on the tractor for operating certain of said valve elements for closing communication between the forward and rear ends of said control line and opening the rear end of said control line to the atmosphere, means comprising a device responsive to pressure in the rear end of said control line for controlling another of said valve elements for closing communication between the rear end of said control line and the atmosphere when pressure in the rear end of said control line increases to a predetermined point, and means comprising a device responsive to pressure in the forward end of said control line and having mechanical connection with one of said valve elements and operable for opening communication between said forward and rear ends of said control line through said valve mechanism when an increase in pressure in the forward end of said control line reaches said valve mechanism.

2. In a tractor-trailer brake system, a control line having a forward end subject to the creation of pressure impulses by means on the tractor for normally connecting it to a source of vacuum, a conversion valve on the trailer to which the rear end of said control line is connected, trailer brake actuators connected to said conversion valve, said conversion valve being operable by pressure impulses in said control line to connect said trailer brake actuators to a source of vacuum, and a valve mechanism connected in said control line, said valve mechanism comprising valve elements controlling communication through said valve mechanism and normally opening communication through said control line and normally closing communication between said control line and the atmosphere, means comprising an electrically operable device subject to control on the tractor for operating certain of said valve elements for closing communication between the forward and rear ends of said control line and opening the rear end of said control line to the atmosphere, means comprising a device responsive to pressure in the rear end of said control line for controlling another of said valve elements for closing communication between the rear end of said control line and the atmosphere when pressure in the rear end of said control line increases to a predetermined point, a chamber in said valve mechanism open to said forward end of said control line, a pressure responsive element subject at one side to pressure in said chamber and at its other side to pressure in said rear end of said control line, said pressure responsive element engaging another of said valve elements, and means comprising an element responsive to pressure in said chamber and subject to operation by an increase in pressure in said chamber incident to an increase in pressure in said forward end of said control line for releasing said first-named pressure responsive element from said other valve element to open communication between said chamber and said rear end of said control line.

3. In a tractor-trailer brake system, a control line having a forward end subject to the creation of pressure impulses by means on the tractor and normally connected to a source of vacuum, a conversion valve on the trailer to which the rear end of said control line is connected, trailer brake actuators connected to said conversion valve, said conversion valve being operable by pressure impulses in said control line to connect said trailer brake actuators to a source of vacuum on the trailer, and a valve mechanism connected in said control line, said valve mechanism comprising a first chamber normally communicating with said forward end of said control line, a second chamber communicating with said rear end of said control line and normally communicating with said first chamber, electrically operable means subject to control on the tractor for closing said first chamber to said forward end of said control line and opening it to the atmosphere to admit pressure to said second chamber, means comprising a device responsive to pressure in said second chamber for closing communication between said chambers when pressure in said second chamber increases to a predetermined point, and means comprising a device responsive to pressure in said forward end of said control line for connecting said forward end of said control line to said second chamber when pressure impulses in said forward end of said control line reach said valve mechanism.

4. A system according to claim 3 wherein said means for closing communication between said first and second chambers further comprises a normally open valve controlling such communication and having biasing means tending to close it, said device responsive to pressure in said second chamber upon a predetermined increase in pressure therein releasing said biasing means for the closing of said valve.

5. A system according to claim 3 wherein said means for closing communication between said first and second chambers further comprises a normally open valve controlling such communication and having biasing means tending to close it, said device responsive to pressure in said second chamber comprising a diaphragm having one side subject to pressure in said second chamber and engaging said valve, and spring means having mechanical connection with said diaphragm to bias it to a normal position in which it holds said valve open, an increase in pressure in said second chamber to said predetermined point acting on said side of said diaphragm to move it against said spring means whereby said biasing means closes said valve.

6. A system according to claim 5 wherein said valve mechanism has a third chamber communicating with said forward end of said control line and to the other side of which said diaphragm is exposed, said diaphragm having a port therethrough, a second valve connected to said first valve and normally closing said port, and pressure responsive means in said third chamber engaging said spring means to overcome the latter upon an increase in pressure in said third chamber whereby said diaphragm is released from said second valve to open communication between said second and third chambers.

7. In a tractor-trailer brake system, a control line having a forward end subject to the creation of pressure impulses by means on the tractor and normally connected to a source of vacuum, a conversion valve on the trailer to which the rear end of said control line is connected, trailer brake actuators connected to said conversion valve, a vacuum line connecting said conversion valve to a source of vacuum on the trailer, said conversion valve being operable by pressure impulses in said control line to connect said vacuum line to the trailer brake actuators, and a valve mechanism connected in said control line and normally opening communication therethrough, said valve mechanism comprising a first chamber normally communicating with said forward end of said control line, a second chamber communicating with said rear end of said control line and normally communicating with said first chamber, means comprising an electrically operable device subject to control on the tractor for closing said first chamber to said forward end of said control line and opening it to the atmosphere to admit pressure to said second chamber, means comprising a pressure responsive device subject to pressure in said second chamber for closing communication between said first and second chambers when pressure in the latter increases to a predetermined point, and means comprising a pressure responsive device subject to pressure in said forward end of said control line and associated with said first-named pressure responsive device for connecting said forward end of said control line to said second chamber when pressure impulses in said forward end of said control line reach said valve mechanism.

8. In a tractor-trailer brake system, a control line having a forward end subject to the creation of pressure impulses by means on the tractor and normally connected to a source of vacuum, a conversion valve on the trailer to which the rear end of said control line is connected, trailer brake actuators connected to said conversion valve, a vacuum line connecting said conversion valve to a source of vacuum on the trailer, said conversion valve being operable by pressure impulses in said control line to connect said vacuum line to the trailer brake actuators, and a valve mechanism connected in said control line and normally opening communication therethrough, said valve mechanism comprising a first chamber normally communicating with said forward end of said control line, a second chamber communicating with said rear end of said control line and normally communicating with said first chamber, means comprising an electricaly operable device subject to control on the tractor for closing said first chamber to said forward end of said control line and opening it to the atmosphere to admit pressure to said second chamber, means comprising a pressure responsive device subject to pressure in said second chamber for closing communication between said first and second chambers when pressure in the latter increases to a predetermined point, said valve mechanism having a third chamber communicating with said forward end of said control line, said pressure responsive device having a pressure surface open to said second chamber and another pressure surface open to said third chamber, and a valve device normally closing communication betweeen said second and third chambers, said valve device having limited movement in the direction of movement of said pressure responsive device under the influence of pressure increases in said second chamber, whereby, when said pressure responsive device moves beyond the point where said first and second chambers are closed to each other, further movement of said pressure responsive device will open said valve device and connect said second and third chambers.

9. In a tractor-trailer brake system, a control line having a forward end subject to the creation of pressure impulses by means on the tractor for normally connecting it to a source of vacuum, a conversion valve on the trailer to which the rear end of said control line is connected, trailer brake actuators connected to said conversion valve, said conversion valve being operable by pressure impulses in said control line to connect said trailer brake actuators to a source of vacuum, and a valve mechanism connected in said control line, said valve mechanism comprising valve elements controlling communication through said valve mechanism and normally opening communication through said control line and normally closing communication between said control line and the atmosphere, means comprising an electrically operable device subject to control on the tractor for operating certain of said valve elements for closing communication between the forward and rear ends of said control line and opening the rear end of said control line to the atmosphere, means comprising a pressure responsive device subject to pressure in the rear end of said control line for controlling another of said valve elements for closing communication between the rear end of said control line and the atmosphere when pressure in the rear end of said control line increases to a predetermined point, means comprising a pressure responsive device subject to pressure in said forward end of said control line and associated with one of said valve elements and operable for opening communication through said valve mechanism when an increase in pressure in the forward end of said control line reaches said valve mechanism, and means responsive to pressure in the rear end of said control line and operative when pressure in said rear end of said control line is higher than pressure in said forward end of said control line, incident to de-energization of said electrically operable device, for relieving pressure from said rear end of said control line to said forward end of said control line.

10. In a tractor-trailer brake system, a control line having a forward end subject to the creation of pressure impulses by means on the tractor and normally connected to a source of vacuum, a conversion valve on the trailer to which the rear end of said control line is connected, trailer brake actuators connected to said conversion valve, said conversion valve being operable by pressure impulses in said control line to connect said trailer brake actuators to a source of vacuum on the trailer, and a valve mechanism connected in said control line, said valve mechanism comprising a first chamber normally communicating with said forward end of said control line, a second chamber communicating with said rear end of said control line and normally communicating with said first chamber, means comprising normally inoperative electromagnetic means, having a circuit including a normally open switch on the tractor, energizable for closing said first chamber to said forward end of said control line and opening it to the atmosphere to admit pressure to said second chamber, means comprising a device responsive to pressure in said second chamber for closing communication between said chambers when pressure in said second chamber increases to a predetermined point, means comprising a device responsive to pressure in the forward end of said control line for connecting said forward end of said control line to said second chamber when pressure impulses in said forward end of said control line reach said valve mechanism, and means responsive to pressure in said second chamber and operative when pressure in said second chamber exceeds pressure in said first chamber, incident to the opening of said switch, for releasing pressure from said second chamber to said first chamber.

11. A system according to claim 10 wherein said means for relieving pressure from said second chamber to said first chamber comprises a check valve opening toward said first chamber and having a port therethrough, said means for closing communication between said chambers comprising a valve movable to close said port.

12. In a tractor-trailer brake system, a control line having a forward end subject to the creation of pressure impulses by means on the tractor and normally connected to a source of vacuum, a conversion valve on the trailer to which the rear end of said control line is connected, trailer brake actuators connected to said conversion valve, said conversion valve being operable by pressure impulses in said control line to connect said trailer brake actuators to a source of vacuum on the trailer, and a valve mechanism connected in said control line, said valve mechanism comprising a first chamber normally communicating with said forward end of said control line, a second chamber communicating with said rear end of said control line and normally communicating with said first chamber, means comprising an electromagnetic device having a circuit including a normally open switch on the tractor, energizable for closing said first chamber to said forward end of said control line and opening it to the atmosphere to admit pressure to said second chamber, means comprising a device responsive to pressure in said second chamber for closing communication between said chambers when pressure in said second chamber increases to a predetermined point, said pressure responsive device comprising a diaphragm exposed to said second chamber, a normally open valve between said chambers having mechanical engagement with said diaphragm and biased to closed position to be moved to such position when said diaphragm is moved by an increase in pressure in said second chamber, and means comprising a device responsive to pressure in the forward end of said control line for connecting said forward end of said control line to said second chamber when pressure impulses in said forward end of said control line reach said valve mechanism.

13. A system according to claim 12 wherein said valve mechanism is provided with a third chamber to which the other side of said diaphragm is exposed, said diaphragm having a port therethrough, said last-named means comprising a second valve connected to said normally open valve and normalling closing said port, said last-named pressure responsive device comprising a second diaphragm exposed at one side to said third chamber and having an element engaging said first-named diaphragm, and a spring engaging said second diaphragm to bias it toward said first-named diaphragm whereby said element tends to hold said first-named diaphragm in a normal position, said third chamber communicating with said forward end of said control line and said valve mechanism having a fourth chamber to which the other side of said second diaphragm is exposed and in which said spring is arranged, said fourth chamber being connected to a source of vacuum.

14. In a tractor-trailer brake system, vacuum operable brake actuators on the tractor, control means on the tractor, having a pedal, normally connecting said actuators to a source of vacuum and operable for admitting air to said actuators to operate them, a conversion valve on the trailer, a control line having a forward end connected to said control means and a rear end connected to said conversion valve, trailer brake actuators connected to said conversion valve, a vacuum line connecting said conversion valve to a source of vacuum, said conversion valve being operable by increases in pressure in said control line incident to operation of said control means for connecting said trailer brake actuators to said vacuum line, and a valve mechanism connected in said control line, said valve mechanism comprising valve elements normally opening communication through said control line and closing such line to the atmosphere, means comprising a normally inoperative electrically operable device subject to operation upon initial movement of said pedal from an off position for operating certain of said valve elements for closing communication through said control line and opening said rear end of said control line to the atmosphere, means comprising a device responsive to pressure in the rear end of said control line for controlling another of said valve elements for closing communication between said rear end of said control line and the atmosphere when pressure in said rear end of said control line increases to a predetermined point, and means comprising a device responsive to pressure in the forward end of said control line and associated with one of said valve elements and operable for opening communication through said valve mechanism when an increase in pressure in the forward end of said control line reaches said valve mechanism.

15. A system according to claim 14 provided with a check valve between said ends of said control line movable to open position to exhaust air from said rear end of said control line into said forward end of said control line when said pedal returns toward normal position and said electrically operable means is rendered inoperative.

16. In a tractor-trailer brake system, vacuum operable brake actuators on the tractor, control means on the tractor, having a pedal, normally connecting said actuators to a source of vacuum and operable for admitting air to said actuators to operate them, a conversion valve on the trailer, a control line having a forward end connected to said control means and a rear end connected to said conversion valve, trailer brake actuators connected to said conversion valve, a vacuum line connecting said conversion valve to a source of vacuum, said conversion valve being operable by increases in pressure in said control line incident to operation of said control means for connecting said trailer brake actuators to said vacuum line, and a valve mechanism connected in said control line, said valve mechanism comprising valve elements normally opening communication through said control line and closing such line to the atmosphere, means comprising a normally inoperative electrically operable device subject to operation upon initial movement of said pedal from an off position for operating certain of said valve elements for closing communication through said control line and opening said rear end of said control line to the atmosphere, means comprising a device responsive to pressure in the rear end of said control line for controlling another of said valve elements for closing communication between said rear end of said control line and the atmosphere when pressure in said rear end of said control line increases to a predetermined point, a chamber in said valve mechanism open to said forward end of said control line, a pressure responsive element subject at one side to pressure in said chamber and at its other side to pressure in said rear end of said control line, said pressure responsive element normally engaging another of said valve elements to close communication between said chamber and said rear end of said control line, and means comprising a pressure responsive element subject to operation by an increase in pressure in said chamber incident to an increase in pressure in said forward end of said control line for releasing said last-named pressure responsive element from said other valve element to open communication between said chamber and said rear end of said control line.

References Cited in the file of this patent

UNITED STATES PATENTS

| | | |
|---|---|---|
| 2,434,050 | Price | Jan. 6, 1948 |
| 2,634,742 | Price | Apr. 14, 1953 |